F. S. DICKINSON.
THERMOMETER.
APPLICATION FILED DEC. 11, 1915.

1,172,117.                            Patented Feb. 15, 1916.

WITNESSES
George L. Blume.

INVENTOR
Fairleigh S. Dickinson
BY
ATTORNEYS

UNITED STATES PATENT OFFICE.

FAIRLEIGH S. DICKINSON, OF RUTHERFORD, NEW JERSEY.

THERMOMETER.

1,172,117.  Specification of Letters Patent.  Patented Feb. 15, 1916.

Original application filed December 13, 1910, Serial No. 597,177. Divided and this application filed December 11, 1915. Serial No. 66,344.

*To all whom it may concern:*

Be it known that I, FAIRLEIGH S. DICKINSON, a citizen of the United States, and a resident of Rutherford, in the county of Bergen and State of New Jersey, have invented a new and Improved Thermometer, of which the following is a full, clear, and exact description, this being a division of the application Serial No. 597,177, filed by me on December 13, 1910.

The object of the invention is to improve and simplify the construction of the carrying case or sheath and its relation to the thermometer with a view to insure an automatical centering of the thermometer, when placed into the case by the user, to keep the bulb end of the thermometer spaced from and out of contact with the closed end of the carrying case, and to permit the quick and convenient insertion in or removal from the carrying case of the thermometer without danger of breaking or otherwise injuring the thermometer.

In order to accomplish the desired result, use is made of a case open at one end and closed at the other end, resilient centering means intermediate the ends of the said case, and a thermometer adapted to be inserted in the said case to engage the said centering means, the said thermometer having a bulb at one end and a handle at the other end, the said handle being adapted to be seated by a slip contact on the said open end of the case to center the outer end of the thermometer on the outer end of the case and to limit the inward movement of the thermometer in the case, the bulb of the thermometer being spaced from and out of contact with the said closed end of the thermometer at the time the handle is seated on the said open case end.

A practical embodiment of the invention is represented in the accompanying drawings forming a part of this specification, in which similar characters of reference indicate corresponding parts in all the views.

Figure 1:
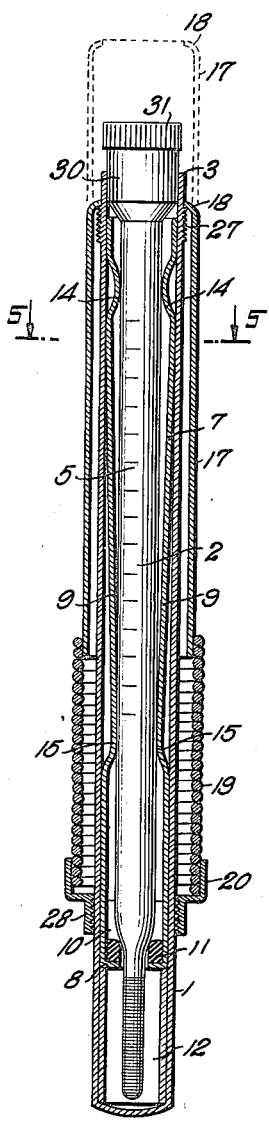
Figure 2:
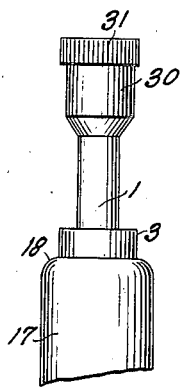
Figure 3:
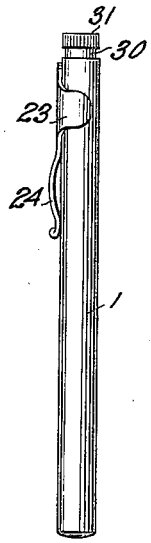
Figure 4:
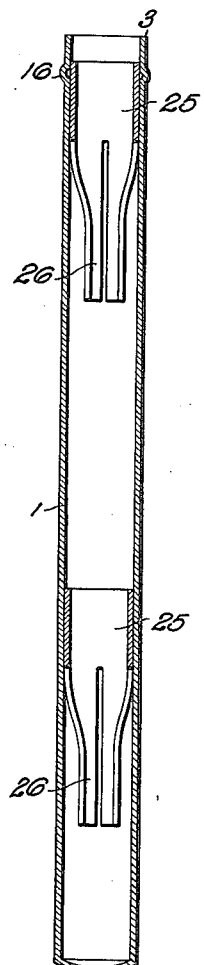
Figure 5:
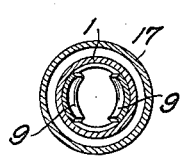

Figure 1 is a side elevation of the thermometer in position in the carrying case, the latter being provided with a shaking attachment, the case and shaking attachment being shown in section; Fig. 2 is a side elevation of the upper portion of the same with the thermometer shown partly withdrawn from the case; Fig. 3 is a reduced side elevation of the case with the thermometer inserted therein and the case provided with a safety pocket clip, the shaking device being omitted; Fig. 4 is a sectional side elevation of a carrying case provided with a modified form of centering device; and Fig. 5 is a sectional plan view of the device shown in Fig. 1, the section being on the line 5—5 of Fig. 1.

The tubular casing 1 is of a diameter and length adapted for the reception of the thermometer tube 2 so that the latter may be housed and protected in order that it may be carried in the pocket without liability of breakage when not required for use. The case 1 is closed at the lower end but open at the upper end, as shown at 3, for the convenient introduction and withdrawal of the thermometer tube.

In connection with the carrying case 1 are provided retaining means 7 for retaining the thermometer tube 2 in position within the said case and preventing breakage of the tube due to accidental slipping of the same from the case. The retaining means 7 are in the form of a spring device formed of an integral piece of sheet metal having a circular member 8 centrally apertured for the passage of the bulb end of the thermometer tube and provided with oppositely facing spring arms 9, 9, said arms being so constructed adjacent to the member 8 as to produce a cylindrical socket 10, which is adapted to fit snugly within the lower end of the tubular case above a shoulder afforded by tube section 12, and is adapted to receive and retain a gasket 11 of soft rubber or the like affording a cushioned support for the lower extremity of the thermometer tube, operating to hold the same in such position that its lower bulb end is retained out of contact with the closed lower extremity of the carrying case 1. The spring arms 9, 9 are extended lengthwise within the tubular case 1 above the cylindrical part 10 to receive the thermometer tube between them when the same is inserted within the case 1.

The spring arms 9 are provided with inwardly bent cushioned portions 14, 15 adapted to contact with the opposite sides of the thermometer tube 2. The cushioned portions 14 are opposite to each other, adjacent to the open upper end 3 of the case, whereby the thermometer tube is inserted so as to centrally position the same during its insertion in the case, and the portions 15 are constructed and arranged in a corresponding manner, adjacent to the cylindrical portion 10, so as to centrally position the lower end of the thermometer tube in alinement with the central opening of the member 8 during the introduction of the tube within the carrying case 1. The cushioned portions 14 and 15 not only facilitate the introduction of the thermometer tube within the casing member 1 but also operate by their resilient engagement therewith to hold the said tube securely within the carrying case when in place therein, the walls permitting ready withdrawal of the thermometer tube from the carrying case when desired for use, and since the uppermost cushioned portions or members 14 are adjacent to the open or mouth end 3 of the case member and are positioned at opposite sides of part of said member it will be obvious that these portions or members 14 by engagement with the flattened surfaces, commonly provided upon clinical thermometers in the production of the lenses therewith, will operate to prevent the thermometer tube 2 from turning in the case.

The retaining means shown in Fig. 4 comprise short tube sections 25, 25 secured within the upper and lower ends of the carrying case 1 and provided with spring tongues 26 adapted for resilient engagement with the thermometer tube 2 to centrally position the same within the carrying case.

To facilitate the withdrawal of the thermometer tube 2 from the carrying case 1, the thermometer tube is made of such length that when its bulb end is securely rested upon the cushion or gasket its upper extremity will protrude slightly from the open mouth end 3 of the carrying case in position to be readily grasped between the fingers. The upper end of the thermometer tube 2 is in the form of a handle 30 of a diameter to fit snugly within the upper open end 3 of the carrying case so as to operate to retain the thermometer against accidental displacement when inserted in the said carrying case. The handle 30 is provided with a milled part 31 to facilitate grasping the same between the fingers. It will be noticed that by the slipping engagement of the handle 30 with the upper end 3 of the carrying case 1 the thermometer tube 2 is securely held against displacement in the case and at the same time the user can readily take hold of the handle 30 and pull the thermometer out of the carrying case without resorting to unscrewing or similar unfastening actions.

The shaking attachment shown in Figs. 1 and 2 forms the subject matter of the original application above referred to, so that further description of the same is not deemed necessary, it being sufficient to state that the said shaking attachment consists essentially of a sleeve 17 connected by a spring 19 of a helically coiled wire with a socket 20 slidable on the carrying case 1. The upper end 18 of the sleeve 17 is swaged inwardly and engages the upper end of the carrying case 1 and is adapted to abut against the stop 16 (see Fig. 4) or against the end of screw threads 28 formed on the socket 20 to hold the carrying case and the shaking attachment locked when in extended position, as more fully explained in the application above referred to.

The carrying case 1 may be provided at its upper portion with a clip 23 having a spring tongue 24 engageable over the edge of a pocket when the carrying case is inserted therein so as to securely hold the device within the pocket.

Having thus described my invention, I claim as new and desire to secure by Letters Patent:

1. A device of the character described, comprising a carrying case open at one end, a clinical thermometer insertible therein, said thermometer having a fragile bulb at its lower end and a handle at its upper end, said handle being partially insertible within and withdrawable from the open end of the case and adapted to combine simple endwise movement of the thermometer by contact with the walls of the case when inserted therein to afford a closure for the open end thereof and to limit the inward movement of the said thermometer, the latter when inserted in the said carrying case having its lower bulb end spaced from and out of contact with the closed end of the carrying case, and a tubular member through which the thermometer passes, said tubular member having resilient tongues adapted to engage the opposite sides of the thermometer so as to centrally position the same within the case and prevent contact of the thermometer with the sides of the case at points below the said upper end.

2. In a device of the character described, a case open at one end and closed at the other end, resilient centering means intermediate the ends of the said case, and a thermometer adapted to be inserted in the said case to engage the said centering means, the said thermometer having a bulb at one end and an integral handle at the other end, the said handle being adapted to be seated by a slip contact in the said open end of the case to center the outer end of the thermometer in the outer end of the case and to limit the inward movement of the thermometer in the case, the bulb of the thermometer being spaced from and out of contact with the said closed end of the thermometer at the time the handle is seated in the said open case end.

In testimony whereof I have signed my name to this specification in the presence of two subscribing witnesses.

FAIRLEIGH S. DICKINSON.

Witnesses:
THEO. G. HOSTER,
GEORGE H. EMSLIE.